(12) United States Patent
Norton et al.

(10) Patent No.: US 8,548,799 B2
(45) Date of Patent: Oct. 1, 2013

(54) METHODS AND APPARATUS TO HELP USERS OF A NATURAL LANGUAGE SYSTEM FORMULATE QUERIES

(75) Inventors: Gray Salmon Norton, Portola Valley, CA (US); Francois Huet, Santa Cruz, CA (US); Pierre Berkaloff, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 858 days.

(21) Appl. No.: 11/463,722

(22) Filed: Aug. 10, 2006

(65) Prior Publication Data

US 2007/0038619 A1    Feb. 15, 2007

Related U.S. Application Data

(60) Provisional application No. 60/706,915, filed on Aug. 10, 2005.

(51) Int. Cl.
*G06F 17/27* (2006.01)
*G06F 7/00* (2006.01)
*G06F 17/30* (2006.01)

(52) U.S. Cl.
USPC .................... 704/9; 707/706; 707/759

(58) Field of Classification Search
USPC .................................. 704/4, 9, 231
See application file for complete search history.

(56) References Cited

U.S. PATENT DOCUMENTS

| | | | | |
|---|---|---|---|---|
| 5,428,735 A * | 6/1995 | Kahl et al. | | 715/839 |
| 5,911,138 A * | 6/1999 | Li et al. | | 1/1 |
| 6,185,530 B1 * | 2/2001 | Ittycheriah et al. | | 704/255 |
| 6,498,921 B1 * | 12/2002 | Ho et al. | | 434/362 |
| 6,564,213 B1 * | 5/2003 | Ortega et al. | | 1/1 |
| 7,152,061 B2 * | 12/2006 | Curtis et al. | | 1/1 |
| 7,254,774 B2 * | 8/2007 | Cucerzan et al. | | 715/257 |
| 2002/0147724 A1 * | 10/2002 | Fries et al. | | 707/100 |
| 2003/0004909 A1 * | 1/2003 | Chauhan et al. | | 706/45 |
| 2003/0023685 A1 * | 1/2003 | Cousins et al. | | 709/205 |
| 2003/0220915 A1 * | 11/2003 | Fagan et al. | | 707/3 |
| 2003/0225571 A1 * | 12/2003 | Levin et al. | | 704/201 |
| 2004/0021700 A1 * | 2/2004 | Iwema et al. | | 345/863 |
| 2004/0024601 A1 * | 2/2004 | Gopinath et al. | | 704/270 |
| 2004/0110120 A1 * | 6/2004 | Ho et al. | | 434/350 |
| 2006/0116877 A1 * | 6/2006 | Pickering et al. | | 704/231 |
| 2006/0190447 A1 * | 8/2006 | Harmon et al. | | 707/4 |
| 2006/0206454 A1 * | 9/2006 | Forstall et al. | | 707/3 |
| 2007/0050348 A1 * | 3/2007 | Aharoni et al. | | 707/4 |
| 2007/0078828 A1 * | 4/2007 | Parikh et al. | | 707/3 |
| 2008/0016034 A1 * | 1/2008 | Guha et al. | | 707/3 |

* cited by examiner

*Primary Examiner* — Richemond Dorvil
*Assistant Examiner* — Olujimi Adesanya
(74) *Attorney, Agent, or Firm* — Vierra Magen Marcus LLP

(57) ABSTRACT

Methods and apparatus provide the capability of receiving at least a portion of a message in natural language format from a user prior to submission of the message to an automated agent for a response, analyzing the at least the portion of the message, and providing a suggestion to the user, based upon the analyzed at least the portion of the message, for altering the message to improve ability of the automated agent to respond to the message.

22 Claims, 4 Drawing Sheets

METHODS AND APPARATUS TO HELP USERS OF A NATURAL LANGUAGE SYSTEM FORMULATE QUERIES

CROSS REFERENCE TO RELATED APPLICATIONS

The present application claims the benefit of U.S. Provisional Patent Application No. 60/706,915, filed on Aug. 10, 2005, which is incorporated herein by reference.

STATEMENT REGARDING FEDERALLY SPONSORED RESEARCH

Not Applicable.

BACKGROUND OF THE INVENTION

As is known in the art, one goal of a natural language system is to 'understand' queries sent by end users and provide the requested information. Similar to human-to-human communication, the quality/focus of an answer to a query often depends upon how the query is phrased. During an in person conversation, the recipient of a question tends to give feedback and 'hints', such as facial expressions, words and utterances, and other feedback, as to the level of understanding of the question formulated by the asker. For example, a person being asked a question may have a quizzical expression if that person has no idea what the other person is asking. This can be considered interactive feedback that enables the asker to better formulate a question and increase the likelihood of an appropriate answer. However, known systems having human-to-computer interaction do not provide such interactive feedback.

SUMMARY OF THE INVENTION

The present invention provides systems and methods for helping a user better formulate a query to an automated agent, for example, by giving feedback to the user prior to submission of the query. The automated agent, which can textually converse in so-called natural language interaction, can run on a computer, such as a server. As the user is typing the query, before submitting the query to the automated agent to get an answer, the system analyzes the query and provides a suggestion to the user on how the query can be modified to enhance the results generated by the system.

In one aspect of the invention, a method comprises receiving at least a portion of a message in natural language format from a user prior to submission of the message to an automated agent for a response analyzing the at least a portion of the message, and providing a suggestion to the user, based upon the analysis of the at least a portion of the message, for altering the message to improve an ability of the automated agent to respond to the message.

The method can further include one or more of the following features: receiving the at least a portion of the message by a server hosting an automated agent where at least a portion of the analysis is performed by the server, the suggestion includes using fewer words, the suggestion includes using at least one different word, providing a display for the user to visualize the suggestion, the display includes the suggestion and a pointer to a part of the message from which the suggestion was generated, the suggestion includes an alternative phrasing for the message, a mechanism to enable the user to select the alternative phrasing, the suggestion is provided in iconic format, the suggestions are partially formulated by a server and finalized on client software, and the suggestions are fully formulated by a server hosting the automated agent.

In another aspect of the invention, a system comprises a server, an automated agent system operatively coupled to the server, the automated agent system including: an answering module to respond to a natural language message from a user, and a suggestion engine to provide suggestions to the user after analysis of the query to enable the user to alter the query for improving an ability of the answering module to respond to the message.

The system can further include one or more of the following features: the suggestion includes using fewer words, the suggestion includes using at least one different word, a module to provide a display for the user to visualize the suggestions, the module to provide the display further including a mechanism to enable the user to select an alternative phrasing, the suggestions are fully formulated by the server, and the suggestions are partially formulated by the server and finalized by client software.

In a further aspect of the invention, an article comprises a storage medium having stored thereon instructions that when executed by a machine result in the following: receiving at least a portion of a message in natural language format from a user prior to submission of the message to an automated agent for a response, analyzing the at least a portion of the message, and providing a suggestion to the user, based upon the analysis of the at least a portion of the message, for altering the message to improve an ability of the automated agent to respond to the message.

The article can further include instructions for receiving the at least a portion of the message by a server hosting an automated agent where at least a portion of the analysis is performed by the server, the suggestion includes using at least one different word, and/or instructions for providing a display for the user to visualize the suggestion.

BRIEF DESCRIPTION OF THE DRAWINGS

The exemplary embodiments contained herein will be more fully understood from the following detailed description taken in conjunction with the accompanying drawings, in which.

DETAILED DESCRIPTION OF THE INVENTION

Figure 1:
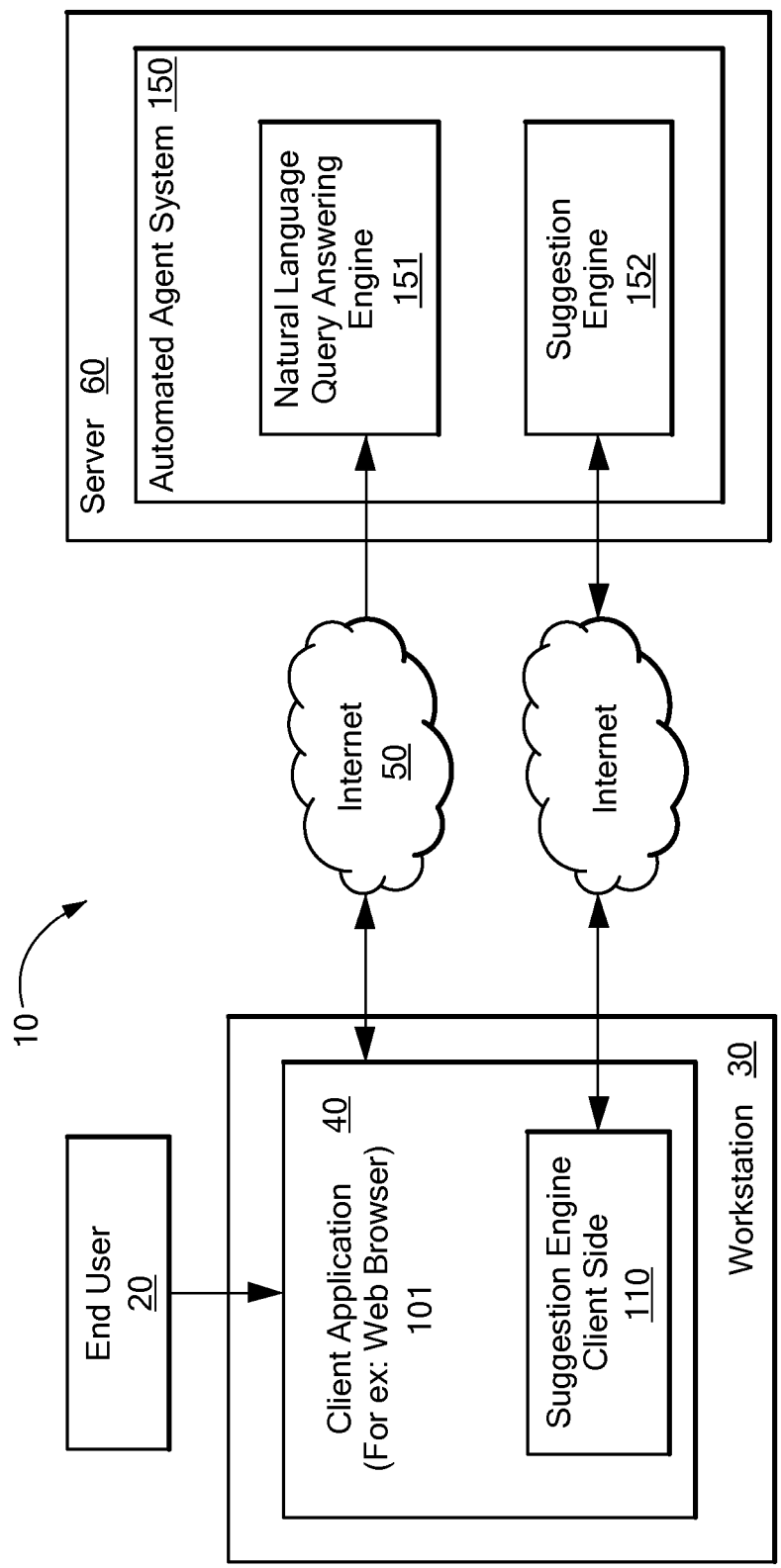
FIG. 1 is a block diagram of a system having interactive query formulation in accordance with the present invention.

FIG. 1 shows a system 10 providing interactive user query formulation in accordance with exemplary embodiments of the present invention. A user 20 interacts with a workstation 30 having a client application 40, such as a Web browser, to facilitate communication via a network 50, such as the Internet, with a server 60. The server 60 includes an automated agent system 150 having a natural language query answering engine 151.

In an exemplary embodiment, the client workstation 30 includes a suggestion engine module 110 and the server 60 includes a server suggestion engine 152. In general, the client and server suggestion engines 110, 152, provide feedback to a user as the user formulates a query for increasing the likelihood that the server can provide useful results in response to the user query, as described more fully below. In one embodiment, the user generates natural language textual queries for submission to the automated agent 150.

While the invention is primarily shown in conjunction with typed natural language interaction between a human and a computer, it is understood that other natural language forms can be used include audio, speech, and the like.

The natural language query processor 151 processes the user queries using conventional natural language processing techniques. Natural language processing is well known to one of ordinary skill in the art.

While shown as separate components, it is understood that the server side suggestion engine 152 and the natural language query processor 151 can be separate, or partially or totally integrated. They can reside on the same or different hardware. One skilled in the art will readily recognize a variety of architectures and hardware and software partitioning without departing from the present invention.

In one embodiment, as the user is preparing a query for submission to the automated agent 150, the query is processed by the client side suggestion engine 110 and/or the server side suggestion engine 152. It is understood that the feedback functionality between the client-side and server side suggestion engines 110, 152 can vary. For example, in one embodiment, the client side suggestion engine 110 provides suggestions based upon relatively straightforward criteria, such as number of words, and the client side suggestion engine 152 provide suggestions on more sophisticated criteria, such as suggested rephrasing of the original message/query for better results.

Figure 2:
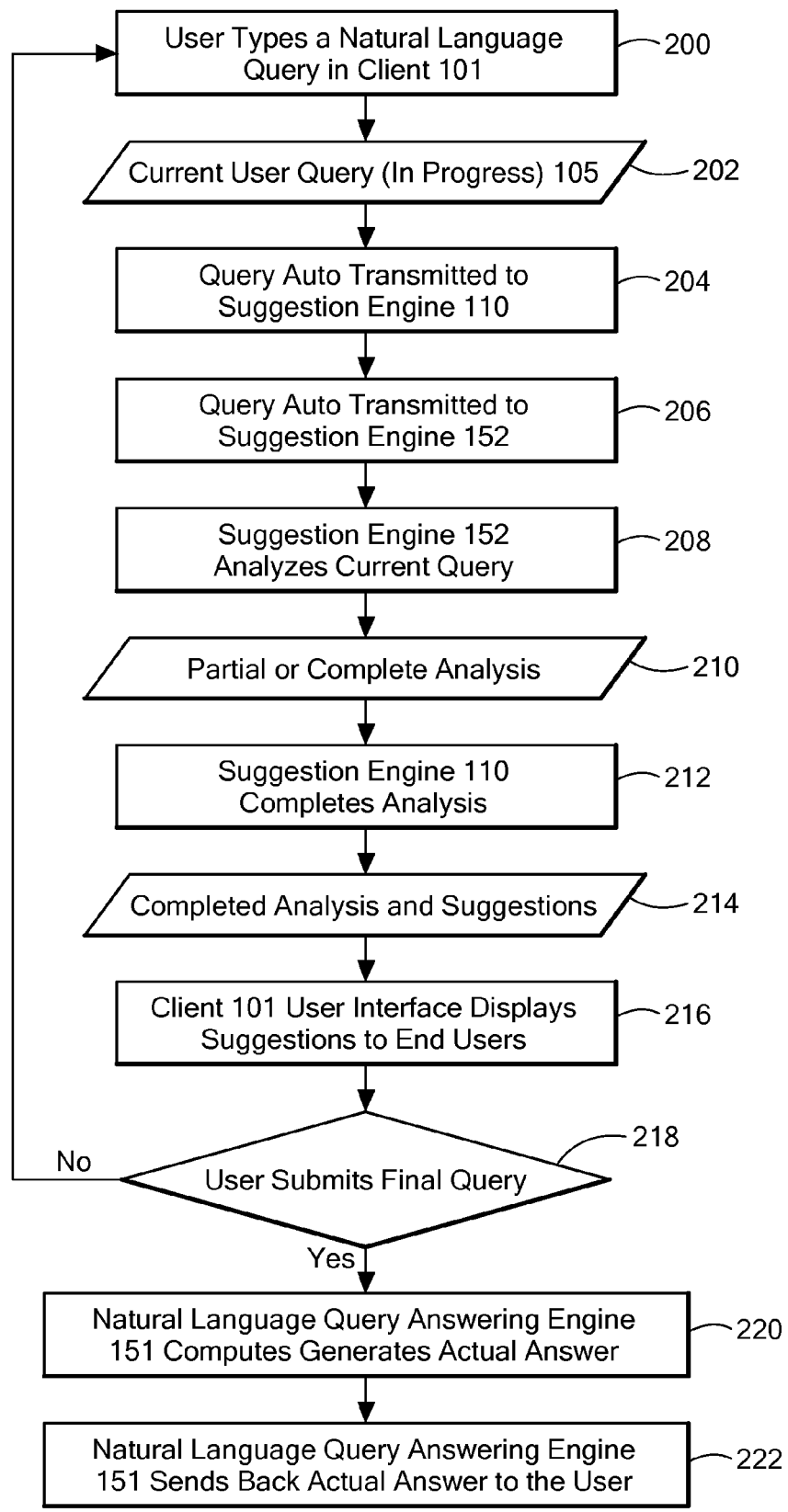
FIG. 2 is a flow diagram showing an exemplary sequence of steps to provide interactive query formulation in accordance with the present invention.

FIG. 2, in conjunction with FIG. 1, shows an exemplary sequence of steps to provide interactive query formulation by the client and server suggestion engines 110, 152. In step 200, a user 20 types in a natural language query using the client workstation 30. In step 202, the user types the query, and at intervals and/or as changes are made to the query (new character typed, or new word completed, etc.), the query is transmitted to the client side suggestion engine 110 in step 204. In step 206, the query is transmitted to the server side suggestion engine 152. In one embodiment, the query in progress is transmitted/analyzed without the user explicitly requesting transmission to the automated agent. Alternatively, the query is not transmitted until requested by the user.

In step 208, the server side suggestion engine 152 analyzes the current query and generates a partial or complete analysis in step 210, and in step 212, completes the analysis and suggestions. In step 214, the analysis, e.g., suggestion, is sent back to the client side suggestion engine 110 for display by the user workstation 30 in step 216.

In step 218, it is determined whether the query is in final form, e.g., submitted by the user. If not, processing continues in step 200. If so, in step 220 the query is submitted for processing by the natural language query processor 151, which generates a response to the query. In step 222, the natural language query processor 151 sends the processed answer to the user through the client workstation 30.

It is understood that suggestions for query changes can be processed on the client workstation, on the server, or as a combination. Thus, the server side suggestion engine 152 can perform the query processing for transmission to the client workstation. Similarly, the analysis may be performed on the client side by the client side suggestion engine 110.

It is understood that analysis of the query to generate suggested changes can utilize various criteria and input. One exemplary criteria includes query length. If the query length becomes excessive, e.g., more than a predetermined number of words and/or characters, and/or the query contains multiple sentences, a warning can be presented to the user suggesting shortening of the query. As part of the suggestions, shorter queries can be displayed. If the typed query is too short or contains insufficient descriptions, warnings can be presented to the user that can include examples of longer/more complete queries.

A further exemplary criteria includes determining whether the words in the query are known to the system. If words are not known by the system, it can be suggested to replace these specific words by synonyms, or to correct their spelling if it is detected that words with a similar spelling are known to the system.

Another illustrative criteria, which requires server-side processing, includes analyzing the input currently entered to check whether it might allow the system to clearly understand the user with minimal ambiguity.

Regardless of the criteria, the resulting analysis can be displayed in a variety of forms including text but also iconic forms, for example. In another embodiment, exemplary criteria can include the grammatical structure of the input. For example, if the input takes a non-question form when the system is designed to answer questions, it can suggest to the user to rephrase it into a question. The grammatical structure of the query can be determined using well known natural language processing techniques.

Figure 3:
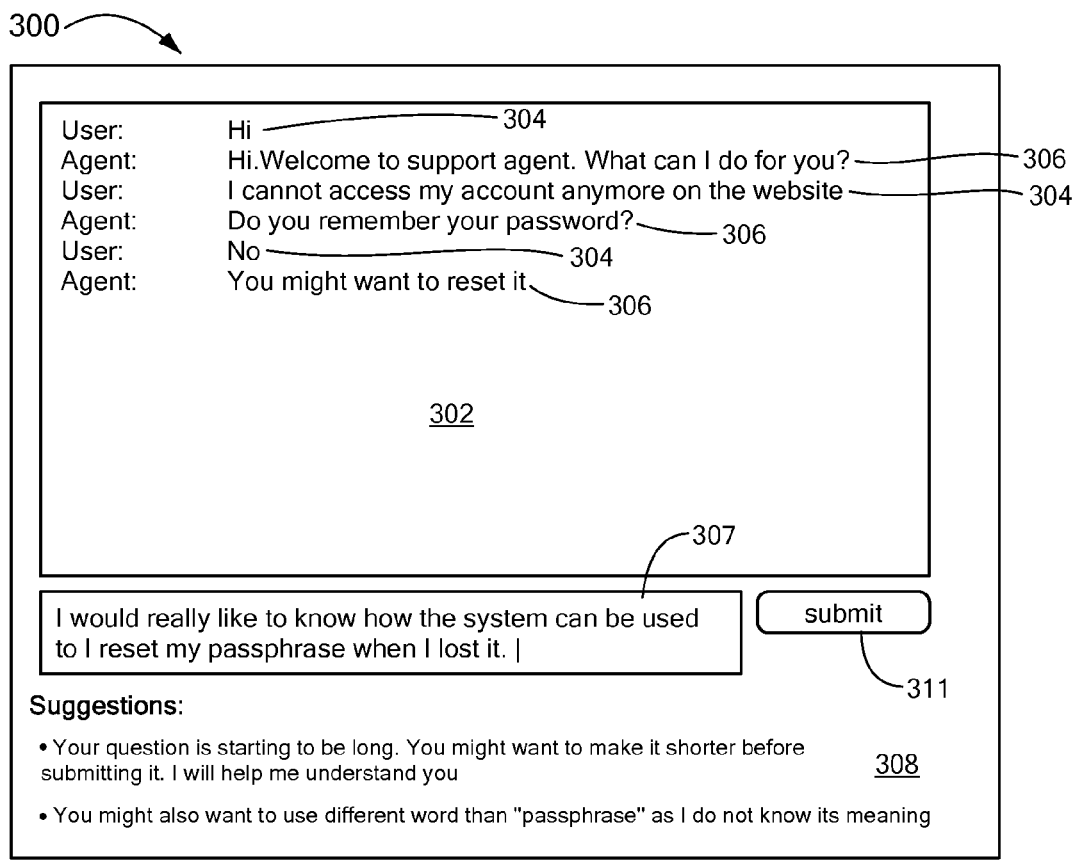
FIG. 3 is a pictorial representation of exemplary interactive query formulation feedback in accordance with the present invention.

FIG. 3 shows an illustrative pictorial representation of interactive query feedback displayed to a user. A display window 300 that can be viewed by a user includes a text region 302 to display text generated by the user 304 and text generated by the automated agent 306. A text input region 307 can enable the user to input the current query.

The window 300 can further include a suggestion region 308 in which the client and/or server suggestion engine 110, 152 can provide suggestions as interactive feedback prior to submission of the query.

Figure 3A:
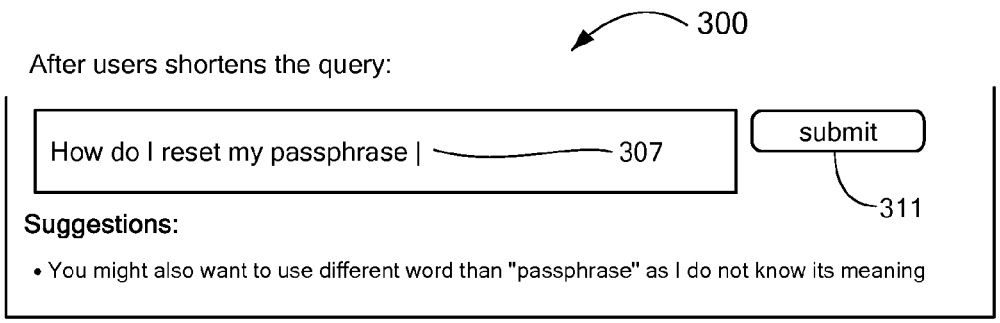
FIG. 3A is a pictorial representation of window having a user query modified in accordance with a suggestion.

FIG. 3A shows the window 300 after the user has shortened the query in the text input region 307. In this case, the user followed the suggestion shown in FIG. 3 to shorten the query. Another suggestion in the suggestion region 308 indicates that the term "passphrase" is not recognized by the system.

Figure 3B:
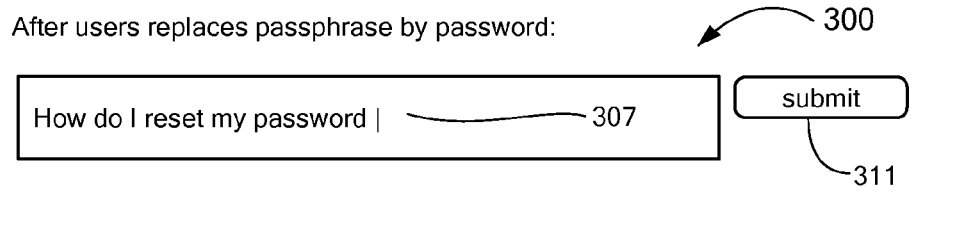
FIG. 3B shows a further pictorial representation of a window having a user query modified in accordance with a suggestion.

FIG. 3B shows the window 300 after the user has replaced the term "passphrase" with the term "password" as suggested in FIG. 3A. The user can then submit the query by clicking on a submit button 311. In another embodiment, the user can click on the term password to replace passphrase.

It is understood that the format of the feedback can take various forms. In the illustrated embodiment, the suggestions as provided as text. In other embodiments, the suggestions can be provided in other visual formats, sounds, and other media.

Figure 4:
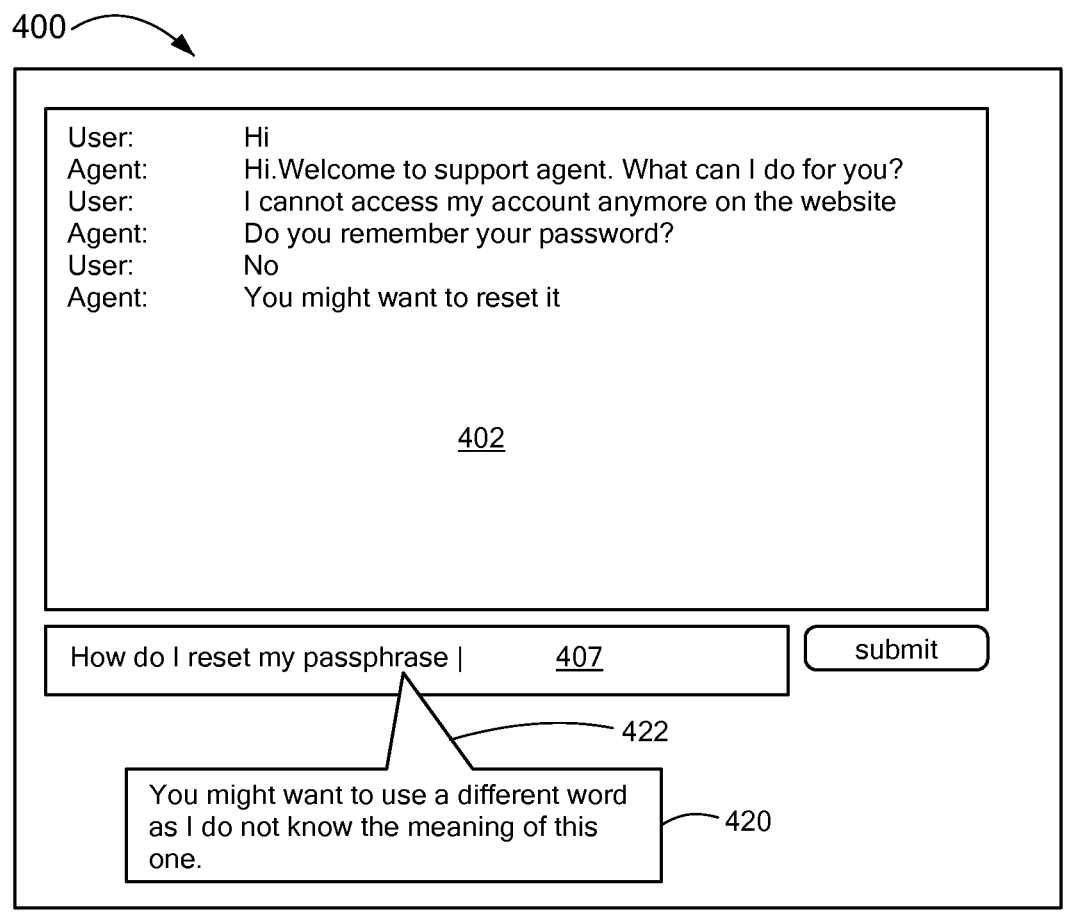
FIG. 4 is a pictorial representation of exemplary interactive query formulation feedback in accordance with the present invention.

For example, FIG. 4 shows an exemplary window 400 having a text region 402 and a text input region 407. Feedback in the form of a suggestion is provided in a text box 420 having a pointer 422 to a particular portion of the sentence to which the feedback is directed. In the illustrated embodiment, the text box 420 pointer 422 points to the term "passphrase" since the suggestion is to replace this term as it is not understood by the system.

In another embodiment of the invention, suggestions are displayed in an iconic form. For example, initially, an icon of a person listening can be displayed as long as the question is not complete/long enough to generate acceptable results. An icon of a puzzled person can be displayed when the question becomes too long or does not generate good results. Many other such variations will be apparent to one of ordinary skill in the art in view of the present disclosure.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A computer implemented method, comprising:
presenting a user interface, the user interface simultaneously presenting a text region, a query entry region, and a suggestion region, the text region to display a natural language interaction simultaneously including both text generated by the user in a final query to the query entry region and text generated by an automated agent responsive to submissions in the query entry region in natural language interaction with the user, the query entry region receiving query text input by the user, and the suggestion region displaying query text modification suggestions;
receiving input query text comprising less than all of a final query in natural language format in the query entry region from a user prior to submission of the final query to the automated agent for a response;
analyzing less than all of the input query text as changes are made to the query text to determine suggestions to the query text input by the user in the query entry region;
providing a suggestion to the user in the suggestion display portion of the user interface, the suggestion responsive to said analyzing, and comprising one or more suggested changes for altering the query text prior to submission as a final query to improve an ability of the automated agent to respond to the final query in the natural language interaction;
wherein said text region, a query entry region, and a suggestion region are simultaneously presented during said receiving, analyzing and providing.

2. The computer implemented method according to claim 1, further including receiving the at least a portion of the query text by a server hosting an automated agent where at least a portion of said analyzing is performed by the server.

3. The computer implemented method according to claim 1, wherein the suggestion includes using fewer words.

4. The computer implemented method according to claim 1, wherein the suggestion includes using at least one different word.

5. The computer implemented method according to claim 1, further including providing a display for the user to visualize the suggestion.

6. The computer implemented method according to claim 5, wherein the display includes the suggestion and a pointer to a part of the query from which the suggestion was generated.

7. The computer implemented method according to claim 5, wherein the suggestion includes an alternative phrasing for the query.

8. The computer implemented method according to claim 7, further including a mechanism to enable the user to select the alternative phrasing.

9. The computer implemented method according to claim 1, wherein the suggestion is provided in iconic format.

10. The computer implemented method according to claim 1, wherein the suggestions are partially formulated by a server and finalized on client software.

11. The computer implemented method according to claim 1, wherein the suggestions are fully formulated by a server hosting the automated agent.

12. A computing system, comprising:
a user interface, the user interface simultaneously presenting a text region a query entry region, and a suggestion region, the text region displaying a natural language interaction including text generated by the user after submission of a final query to the query entry region interlaced with text generated by an automated agent responsive to the final query in a natural language interaction question and answer session;
the query entry region to receive query text input by the user and the suggestion display portion region simultaneously displaying query text modification suggestions prior to submission of the final query;
an automated agent system operatively coupled to the user interface, the automated agent system including:
an answering module to respond in a natural language interaction to a final query presented in natural language and submitted by a user in the query entry region, the answering module outputting a response in a natural language form in the text region following a display of the final query in the text entry region; and
a suggestion engine to provide query text modification suggestions to the user in the suggestion region, the suggestion engine analyzing query text as changes are made to the query text and providing suggestions to enable the user to create a final query improving an ability of the answering module to respond to the final query.

13. The system according to claim 12, wherein the computing system includes a server and a client, the user interface provided on the client, the client providing the at least portion of the query to the server, the suggestion engine provided on the server and wherein the suggestions are fully formulated by the server.

14. The system according to claim 12, wherein the computing system includes a server and a client, the user interface provided on the client, the client providing the at least portion of the query to the server, the suggestion engine provided on the server and wherein the suggestions are partially formulated by the server and finalized by client software.

15. A computer implemented method, comprising:
presenting a user interface, the user interface simultaneously displaying a text region, a query entry region, and a suggestion region, the text region to simultaneously display multiple alternating entries of text generated by the user after submission of a final query in the query entry region and entries of text generated by an automated agent responsive to the final query in the query entry region as part of a natural language interaction, the query entry region receiving query text input by the user, and the suggestion region displaying query text modification suggestions;
receiving input query text comprising less than all of a final query message in natural language format from a user in the query entry region prior to submission of the query text as a final query to an automated agent for a response;
analyzing less than all of the input query text as changes are made to the query text to determine suggestions to the query text input by the user in the query entry region;

providing a suggestion to the user in the suggestion display portion of the user interface, the suggestion responsive to said analyzing, and comprising one or more suggested changes for altering the query text prior to submission as a final query to improve an ability of the automated agent to respond to the query in a natural language form;

wherein said text region, a query entry region, and a suggestion region are simultaneously displayed during said receiving, analyzing and providing.

16. The article according to claim 15, further including instructions for receiving the at least a portion of the message by a server hosting an automated agent where at least a portion of the analysis is performed by the server.

17. The article according to claim 15, wherein the suggestion includes using at least one different word.

18. The computer implemented method of claim 1 wherein the step of analyzing comprises analyzing the query prior to receiving an indication from the user that the query is complete.

19. The computer implemented method of claim 18 further wherein the step of analyzing comprises analyzing less than a full query before a user submits a final query.

20. The computer implemented method of claim 1 further including receiving an altered query from the user and determining that the query is in final form as submitted by the user.

21. The system according to claim 12, wherein the at least portion of the query is transmitted to the suggestion engine at intervals.

22. The system according to claim 12, wherein the at least portion of the query is transmitted to the suggestion engine as changes are made to the query.

* * * * *